United States Patent Office 3,062,717
Patented Nov. 6, 1962

3,062,717
INTRAMUSCULAR CALCIUM TETRACYCLINE ACETIC OR LACTIC ACID CARBOXAMIDE VEHICLE PREPARATION
Henry F. Hammer, Seaford, N.Y., assignor to Chas. Pfizer & Co., Inc., New York, N.Y., a corporation of Delaware
No Drawing. Filed Dec. 11, 1958, Ser. No. 779,534
5 Claims. (Cl. 167—65)

This invention is concerned with new and novel liquid antibiotic compositions adapted for parenteral administration. Specifically, the invention is concerned with tetracycline solutions adapted for intramuscular use. These solutions are remarkably stable at certain hydrogen ion concentrations, and are comprised of the antibiotic and a metal salt dissolved in an aqueous lower aliphatic carboxamide. These preparations possess unique advantages and represent a definite improvement over prior compositions both with regard to shelf stability and compatibility with the tissues on intramuscular injection.

Although tetracycline may be injected intramuscularly as the base or as an acid addition salt with the achievement of antibiotic blood levels in the system, it has been found that appreciable irritation often accompanies such injections and particularly if repeated injections are made at the same point or at places close to the original injection. Furthermore, there is a tendency for residual material to remain in the muscle at the site of injection for considerable periods. This is definitely an undesired effect since it results in the formation of fibrous tissue and necrosis. These disadvantages have been overcome to a substantial degree by the use of dry solid formulations for reconstitution containing the antibiotic with local anesthetics and certain inorganic salts to improve the degree of absorption and reduce the irritation caused by the antibiotic. Such formulations are, however, stable for only short periods of time when dissolved in water and, therefore, solutions thereof must be prepared by the physician immediately prior to use. While such a mode of administration is adequate, it is quite inconvenient, and, in addition, use under adverse circumstances provides opportunity for contamination by dirt or microorganisms as well as for error. In order to overcome these disadvantages, solutions of tetracycline in various vehicles have been suggested in the past but none has been satisfactory from the standpoint of tissue irritation, absorption on intramuscular injection, and shelf stability.

An object of the present invention, therefore, is to provide stable solutions of tetracycline which are non-irritating upon intramuscular injection and from which the antibiotic activity is readily absorbed into the blood stream of the animal organism. Further objects will be apparent from the following disclosure.

It has now been found that aqueous solutions containing a substantial proportion of a physiologically acceptable water soluble lower aliphatic amide provide remarkably stable tetracycline solutions having relatively high concentrations of antibiotic when suitable proportions of a divalent metal salt and a pH of at least about 8.5 is employed. It is thought that this remarkable stability advantage over other solutions having relatively slight differences in composition and pH is due to the formation of a specific tetracycline metal complex. The composition of the complex is not yet known. Potentiometric and spectrophotometric data indicate the existence of several complexes in solution wherein the molar ratio of metal to antibiotic is 1:1, 2:1, 3:1 and 3:2. Useful neutralizing agents include ammonia, and the physiologically acceptable lower aliphatic water soluble amines having dissociation constants greater than about $10^{-6}$ whose salts of the tetracyline complex formed are soluble in the vehicle employed. Weaker bases are not satisfactory since they do not form the required complex salts. Metal hydroxides and basic salts are less desirable since they frequently yield antibiotic complex salts which are not sufficiently soluble in the vehicle and also involve the injection of additional metal ions. For example, sodium hydroxide leads to the formation of a precipitate which is thought to be the sodium salt of the tetracycline complex. In addition, the localized high pH effect often observed when using a strong base, such as sodium hydroxide, may lead to formation of a difficulty soluble salt of the divalent metal used and to increased difficulties in formation of the metal-antibiotic complex. More dilute solutions can, however, be parepared satisfactorily. The proportion of divalent metal as a physiologically acceptable salt to be employed in the composition is determined by a series of simple experiments to select the proportion having satisfactory solubility. Calcium chloride is the preferred metal salt for use in the present compositions since no adverse physiological effects result from its injection, and a stable, pharmaceutically elegant preparation is obtained. Three moles of a calcium salt per mole of tetracycline is operable. Some variation from this ratio is possible. Thus, the range of 1.0 to 4.0 molar equivalents of calcium salt per mole of tetracycline is operative.

Anions other than the chloride, that is, calcium salts other than calcium chloride, can be employed. It is only necessary that the salt provide a clear solution and that, of course, the anion be physiologically acceptable, compatible in solution with the tetracycline, and stable at the pH of the composition. Satisfactory results are achieved by substituting the ascorbate, acetate, bromide, etc. for the chloride. By appropriate adjustment of the vehicle amide concentration, pH, and metal salt-antibiotic ratio, the corresponding magnesium salts can be substituted for calcium chloride.

The vehicle of the unique compositions of the present invention is an aqueous solution of a physiologically acceptable lower aliphatic carboxamide and preferably an amide of acetic or lactic acid. The carboxamide has a concentration in the range of 35 to 80% by weight of the vehicle, the preferred value being 50% by weight. At lower concentrations, the solubility and stability of the antibiotic is reduced. At amide concentrations exceeding 80% the solvent becomes irritating and not well tolerated on injection. At the preferred value of 50% by weight of carboxamide, the vehicle has excellent solvent characteristics at the desired pH for the antibiotic and salts involved in the composition and the composition is also well tolerated upon intramuscular injection. Suitable amides for the vehicles of the present compositions include, N,N-diethylacetamide, N,N-dimethylacetamide, acetamide, N($\beta$-hydroxyethyl) acetamide, and N-($\beta$-hydroxyethyl) lactamide. In general, any of the lower aliphatic carboxamides can be employed so long as they are not toxic, are not irritating, and that they are solvents for the tetracycline and salts of the composition. In general, the latter causes no difficulty, but the question of physiological compatibility must be carefully evaluated, considering as well prevailing governmental restrictions on the contents of parenteral drugs.

One of the difficulties encountered with aqueous liquid compositions of tetracycline is discoloration and loss of potency which appears to be due in part to oxidative degradation. This problem is particularly aggravated with aqueous solutions, but is also occasionally encountered with aqueous suspensions. In order to avoid this difficulty, oxidizing conditions must be avoided during storage of the present product. To this end, oxygen is excluded from the finished solution and antioxidants are sometimes included in the solution. Antioxidants are not necessary if oxygen has been vigorously excluded by maintaining the product in an inert atmosphere such as an atmosphere of nitrogen, helium, or other non-oxidizing, non-reactive gas.

As a practical matter, it is convenient to employ antioxidants in addition to manufacturing and storing the product in an inert atmosphere. Satisfactory antioxidants are those which are physiologically acceptable for use in parenteral drug products and those which are, of course, compatible with tetracycline. Examples of suitable antioxidants include sodium bisulfite, sodium metabisulfite, and sodium formaldehyde sulfoxylate. Concentrations of the above antioxidants which are effective and still in accordance with governmental regulations for parenteral products are employed in the present formulation. For example, sodium bisulfite is employed in about 0.1% concentration. Generally from about 0.05 to 0.2% concentrations of antioxidant is employed.

The novel compositions of the present invention are prepared by mixing the tetracycline, preferably in the form of an acid addition salt, and the calcium chloride, in water or the aqueous amide mixture of approximately one-half of the final volume of vehicle to be employed. When water is employed, the amide component is then added to the aqueous solution in appropriate quantity. The pH of the mixture is then adjusted to about 8.5 with ammonia or a physiologically acceptable lower aliphatic amine preferably ethanolamine. The pH of the final composition is critical as is the metal salt concentration. The pH should preferably be about 8.5 in order to effect rapid solution of all the components. This is, in fact, the preferred pH. Higher pH's also provide stable solutions but as the pH is increased, above about 9.5, the physiological compatibility of the product with the muscle tissue is decreased. Slightly lower or slightly higher pH's may be employed but the satisfactory range is substantially from 7.0 to 8.5. A great variety of lower aliphatic primary, secondary, and tertiary amines having up to about 6 carbon atoms per group attached to the amino nitrogen atom, can be used for the neutralization step including ethanolamine, diethylamine, ethylamine, triethanolamine, diethanolamine, arginine, glucosamine, etc. The finished composition must, of course, be sterile. Thus, sterile components and conditions of manufacture are employed, or alternatively, the solution itself is sterilized, for instance, by filtration as a final stage of manufacture. The latter offers a number of practical advantages.

The use of the amphoteric form of tetracycline is preparing the present compositions is satisfactory. However, it is first desirable to solubilize the antibiotic by addition of a sufficient quantity of mineral acid or organic acid. An excess of acid over that required to completely solubilize the antibiotic is to be avoided in order to minimize the formation of by-product acid addition salts with the neutralizing agent. Solubilization of the amphoteric antibiotic by the addition of alkali is not as desirable since it may cause precipitation of insoluble metal salts.

The preferred concentration of tetracycline is 50 to 100 mg./ml. when intramuscular injection is the purpose for which the composition is intended.

The dosage of the present compositions is adjusted to provide from 10 mg. to about 500 mg. of tetracycline activity per day for the average adult. Similar or reduced doses may be employed in the treatment of children or small animals. Intramuscular injections are limited in volume to from 2 to 4 ml. Thus, the entire daily dose can be administered in one or two injections.

An alternative method of preparing the compositions of the present invention is to prepare and isolate under sterile conditions the complex $(tetracycline)_3(metal)_2B_2$, and then dissolve it in the sterile aqueous amide vehicle along with the antioxidant. The sterilization can also be conveniently accomplished by filtration of the finished composition. In the above formula, B is the cation of the neutralizing base, the ammonium ion or a substituted ammonium ion. Thus, the pH and metal salt proportion are critical in obtaining the stable complex in solution.

Magnesium tetracycline formulations analogous to the calcium tetracycline formulations disclosed and exemplified herein are prepared by substitution of a physiologically acceptable magnesium salt for the calcium component. In such preparations the pH range of 7.0 to 8.5 is employed and a molar ratio of metal to antibiotic of about 3:1 is advantageous. Such solutions have stable biopotencies of the order of 60% of the charged value due to C–4 epimerization. In therapy, the reduced potency of such compositions, appropriately described as equilibrated compositions, is compensated by the use of suitable overages or increased dosage.

Having described the manner in which my invention is to be practiced, I now provide a series of specific examples thereof which are included to illustrate in greater detail the operation of the present invention. They are, however, not to be considered as limiting the scope of the invention in any way.

*Example 1*

Tetracycline hydrochloride (10.4 gms., 0.02 mole) and calcium chloride dihydrate (8.82 gms., 0.06 mole) are dissolved in 140 ml. of 50% w./w. aqueous N,N-dimethylacetamide to yield a clear solution of pH 1.95. This solution is agitated and kept under a nitrogen atmosphere while the pH is raised rapidly to 7 by the addition of 20% aqueous 2-aminoethanol solution. At this point, sodium formaldehyde sulfoxylate (400 mg.) is introduced and sufficient additional 2-aminoethanol solution is aded to raise the pH to 8.5 and maintain it in this region. A total volume of 21 ml. of 2-aminoethanol solution is required for this size batch of solution.

The tetracycline solution is diluted to 200 ml. with additional 50% w./w. aqueous N,N-dimethylacetamide, sterilized by filtration through an O2 Selas candle, and sealed in glass ampoules that are flushed with nitrogen before and after filling. The bio-assay and chemical assay of the solution thus prepared is 50 mg. of tetracycline per cc.

[Bio-stability data (mg./ml.)]

| Temp. (° C.) | Initial | 1 Wk. | 3 Wks. | 6 Wks. | 12 Wks. | 6 Mo. |
|---|---|---|---|---|---|---|
| 50 | 52.0 | 51.9 | 47.1 | 50.9 | 52.4 | 49.6 |
| 37 | 52.0 | | | | | 47.1 |

The following serum levels were observed in rabbits following intramuscular injection of calcium tetracycline solution of this example at a dose of 6.25 ml. per kl.:

| Average Serum Levels (mcg./ml.) in— | | | | | | |
|---|---|---|---|---|---|---|
| 1 Hr. | 3 Hrs. | 5 Hrs. | 7 Hrs. | 18 Hrs. | 24 Hrs. | 30 Hrs. |
| 0.719 | 0.608 | 0.628 | 0.454 | 0.411 | 0.241 | 0.215 |

The high stability of the composition of this example is readily evident from the above bio-stability. After 6 months' storage at 50° C. approximately 80% of the original activity remained. 91% of the original activity still remained after 6 months' storage at 37° C.

Example II

Utilizing the procedure described in Example I, 200 ml. of solution containing 85 mg. of tetracycline bioactivity per ml. may be prepared from tetracycline hydrochloride (17.48 gms., 0.035 mole), calcium chloride dihydrate (15.4 gms., 0.105 mole), 2-aminoethanol (6.3 gms., 1.04 moles), sodium formaldehyde sulfoxylate (400 mg.) and 50% w./w. aqueous N,N-dimethylacetamide.

[Bio-stability data (mg./ml.)]

| Temp. (° C.) | Initial | 1 Wk. | 3 Wks. | 6 Wks. | 12 Wks. | 6 Mo. |
|---|---|---|---|---|---|---|
| 50 | 84.4 | 82.2 | 82.2 | 83.3 | 88.0 | 67.7 |
| 37 | 84.4 | | | | | 84.5 |

The high stability of this composition is also evident from the above bio-stability data. 80% of the original activity remained after 6 months' storage at 50° C. and essentially all the activity remained after 6 months' storage at 37° C. Intramuscular injection of this composition in rabbits, according to the regimen of Example I, gave essentially the same serum levels.

Example III

The procedure outlined in Example I may be used to prepare stable tetracycline solutions which contain less than three moles of the calcium salt per mole of tetracycline. Thus, tetracycline hydrochloride (10.4 gms., 0.02 mole), calcium chloride dihydrate (6.0 gms., 0.04 mole), 2-aminoethanol (4.2 gms., 0.07 mole), sodium formaldehyde sulfoxylate (400 mg.) and 50% N,N-dimethylacetamide will afford 200 ml. of clear amber solution containing 50 mg. of tetracycline activity per ml.

[Bio-stability data (mg./ml.)]

| Temp. (° C.) | Initial | 1 Wk. | 3 Wks. | 6 Wks. | 12 Wks. | 6 Mo. |
|---|---|---|---|---|---|---|
| 50 | 45.9 | 48.4 | 48.6 | 47.9 | 46.3 | 42.8 |
| 37 | 45.9 | | | | | 45.6 |

The compositions of this example possess high stability as evident from the above data. After 6 months storage at 50° C. and 37° C. approximately 93% and 100% of the initial activity remained.

Example IV

Tetracycline hydrochloride (5.0 gms., 0.01 mole) and calcium ascorbate (11.7 gms., 0.03 mole) are dissolved in 70 ml. of 50% w./w. aqueous N,N-dimethylacetamide. While the resulting solution is stirred under an atmosphere of nitrogen, 2-aminoethanol is introduced from a burette until the pH reaches 7. At this point sodium formaldehyde sulfoxylate (200 mg.) is dissolved in the mixture and the pH is raised to 8.5 and maintained at this value by the further addition of 2-aminoethanol. The total amount of the latter compound required is 2.1 ml. (undiluted). The resulting clear amber solution will contain 50 mg. of tetracycline bio-activity per cc. when diluted to a volume of 100 ml.

The composition was found to have essentially the same stability as the composition of Example III.

Example V

In the procedure disclosed in Example IV, calcium acetate (5.28 gms., 0.03 mole) may be utilized instead of calcium ascorbate. A clear amber solution is obtained which contains 50 mg. of bio-activity per cc.

This solution exhibited essentially the same stability as did the composition of Example IV.

Example VI

Using the procedure outlined in Example IV, calcium bromide (6 gms., 0.03 mole) was substituted for calcium ascorbate. The resulting clear amber solution contains 51 mg. of tetracycline activity per ml.

The stability of this solution was substantially the same as that of the solution of Example IV.

Example VII

The use of tetracycline amphoteric requires a slightly different procedure. Tetracycline amphoteric trihydrate (5.0 gms., 0.01 mole) is dissolved in 40 ml. of undiluted N,N-dimethylacetamide. To this solution, is added a solution of calcium ascorbate (11.7 gms., 0.03 mole) in 40 ml. of distilled water. This operation is carried out under an atmosphere of nitrogen and external cooling is applied to prevent the reaction temperature from exceeding 35° C. 2-aminoethanol (1.5 gm.) and sodium formaldehyde sulfoxylate are added as in the above examples. When the final solution volume is adjusted to 100 ml. with 50% w./w. aqueous N,N-dimethylacetamide, a clear solution containing 50 mg. of activity is obtained.

The stability of this composition after 6 months' storage at 50° C. and 37° C. was comparable to that of the solutions described above.

Example VIII

Using the procedure outlined in Example IV, N-(B-hydroxyethyl) lactamide was substituted for N,N-dimethylacetamide. The clear amber solution which resulted contained 50 mg. of tetracycline activity per ml. and exhibited stability comparable to the composition of Example IV.

Example IX

Utilizing the procedure outlined in Example I but substituting 20% aqueous ammonia for 2-aminoethanol gave a solution of equivalent activity and substantially the same stability.

Example X

The procedure of Example I may be used to prepare stable tetracycline solutions which contain four moles of the calcium salt per mole of tetracycline. Thus, tetracycline hydrochloride (10.4 gms., 0.02 mole), calcium chloride dihydrate (11.76 gms., 0.08 mole), 2-aminoethanol (4.2 gms., 0.07 mole), sodium formaldehyde sulfoxylate (400 mg.) and 50% N,N-dimethylacetamide will afford 200 ml. of clear amber solution containing 50 mg. of tetracycline activity per ml. and of substantially the same stability as the composition of Example I.

What is claimed is:

1. A stable liquid antibiotic composition adapted for intramuscular administration comprising, as vehicle, an aqueous solution containing from 35 to 80% by weight of a physiologically acceptable water soluble lower aliphatic carboxamide selected from the group consisting of an amide of acetic acid and an amide of lactic acid and dissolved in said vehicle from 10 to 100 mg./ml. of a substance selected from the group consisting of tetracycline and a physiologically acceptable acid addition salt thereof, from 1.0 to 4.0 molar equivalents of a soluble physiologically acceptable calcium salt per mole of tetracycline as the essential tetracycline complexing metal, and a sufficient amount of a water soluble physiologically acceptable base selected from the group consisting of ammonia and a water soluble lower aliphatic amine having a dissociation constant of greater than $10^{-6}$ to provide said composition with a pH of about 7.0 to 9.5.

2. A composition as claimed in claim 1 wherein the physiologically acceptable salt is calcium chloride.

3. A composition as claimed in claim 1 wherein the physiologically acceptable salt is calcium ascorbate.

4. A composition as claimed in claim 1 wherein the physiologically acceptable water soluble lower aliphatic carboxamide is N,N-dimethylacetamide.

5. A composition as claimed in claim 1 wherein the physiologically acceptable water soluble lower aliphatic carboxamide is N-(β-hydroxyethyl)-lactamide.

References Cited in the file of this patent

UNITED STATES PATENTS

| | | |
|---|---|---|
| 2,671,748 | Crooks | Mar. 9, 1954 |
| 2,980,584 | Hammer | Apr. 18, 1961 |
| 2,990,331 | Neuman et al. | June 27, 1961 |

FOREIGN PATENTS

| | | |
|---|---|---|
| 535,471 | Canada | Jan. 8, 1957 |
| 201,633 | Australia | Apr. 28, 1955 |

OTHER REFERENCES

Gans et al.: J.A.P.A., Sci. Ed., vol. LXVI, No. 10, October 5, 1957, pp. 587, 591.

Vandenbelt et al.: Science, vol. 121, April 29, 1955, pp. 646–647.

UNITED STATES PATENT OFFICE
CERTIFICATE OF CORRECTION

Patent No. 3,062,717                                November 6, 1962

Henry F. Hammer

It is hereby certified that error appears in the above numbered patent requiring correction and that the said Letters Patent should read as corrected below.

In the heading to the printed specification, lines 2 to 4, for the title "INTRAMUSCULAR CALCIUM TETRACYCLINE ACETIC OR LACTIC ACID CARBOXAMIDE VEHICLE PREPARATION" read -- INTRAMUSCULAR TETRACYCLINE COMPOSITIONS CONTAINING A CALCIUM SALT AND AN ACETAMIDE OR A LACTAMIDE --; column 2, line 22, for "parepared" read -- prepared --; column 2, line 62, for "N($\beta$-hydroxyethyl)" read -- N-($\beta$-hydroxyethyl) --; column 3, line 64, for "is" read -- in --; column 4, line 49, for "aded" read -- added --; line 67, for "kl" read -- kg --.

Signed and sealed this 21st day of May 1963.

(SEAL)
Attest:

ERNEST W. SWIDER                                    DAVID L. LADD
Attesting Officer                                        Commissioner of Patents